Feb. 23, 1926.  1,573,944

B. F. JANCKE

SWITCH CONTROL FOR ELECTRIC HAIR DRIERS

Filed May 18, 1925   3 Sheets-Sheet 1

INVENTOR
Benno F. Jancke
BY
Mock & Blum
ATTORNEYS

Feb. 23, 1926.
B. F. JANCKE
SWITCH CONTROL FOR ELECTRIC HAIR DRIERS
Filed May 18, 1925   3 Sheets-Sheet 2
1,573,944
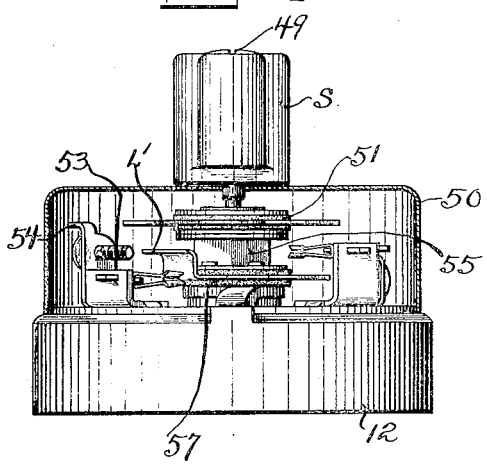
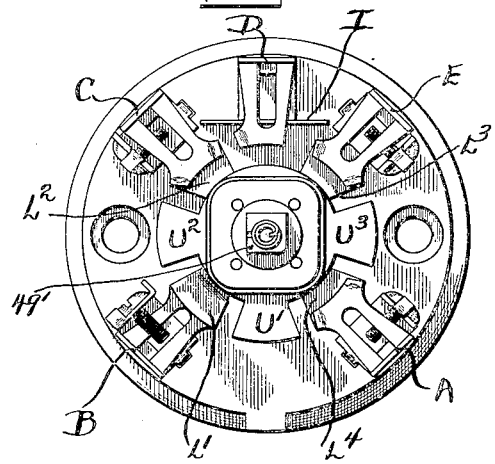
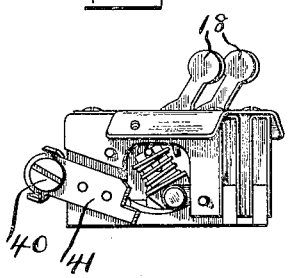
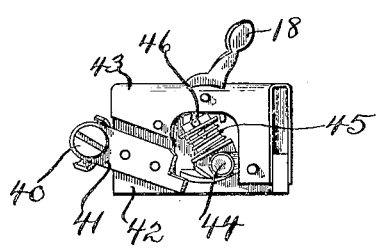
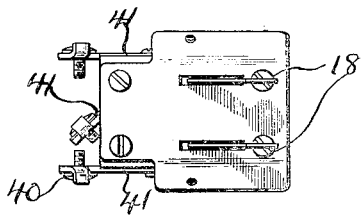
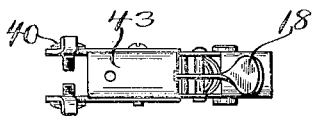
INVENTOR
Benno F. Jancke
BY
Mocht Burn
ATTORNEYS Feb. 23, 1926.
B. F. JANCKE
1,573,944
SWITCH CONTROL FOR ELECTRIC HAIR DRIERS
Filed May 18, 1925  3 Sheets-Sheet 3
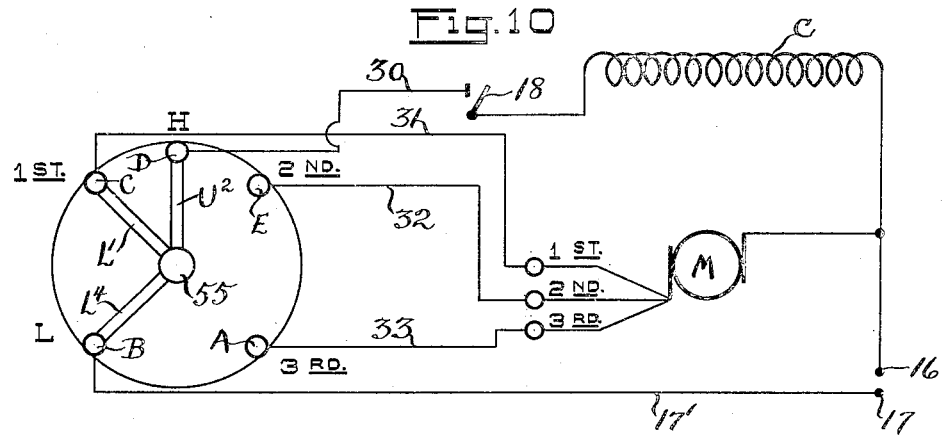
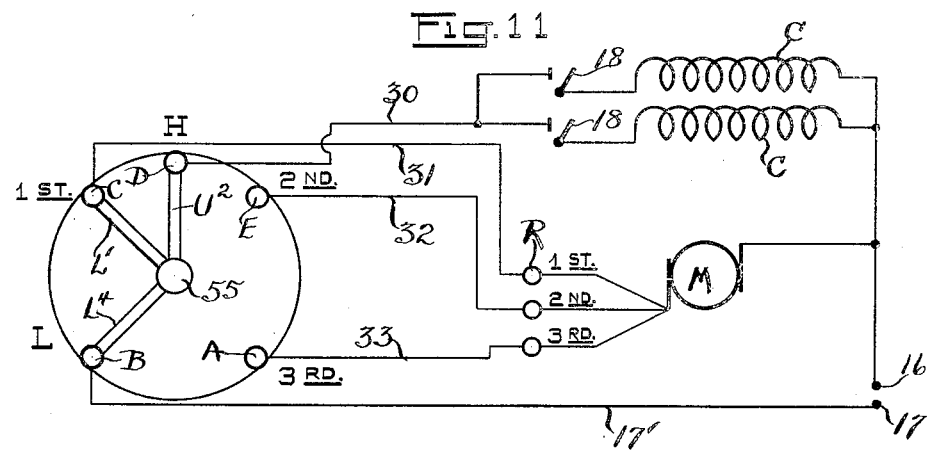
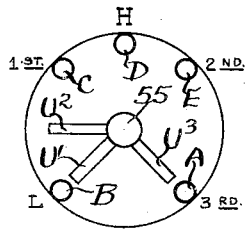 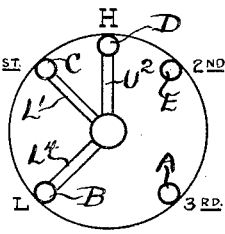 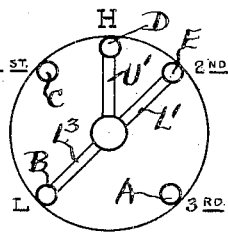 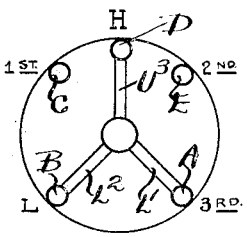
INVENTOR
Benno F Jancke
BY
Mock & Blum
ATTORNEYS Patented Feb. 23, 1926.

1,573,944

UNITED STATES PATENT OFFICE.

BENNO F. JANCKE, OF NEW YORK, N. Y., ASSIGNOR TO HALLIWELL ELECTRIC CO., INC., OF NEW YORK, N. Y., A CORPORATION OF NEW YORK.

SWITCH CONTROL FOR ELECTRIC HAIR DRIERS.

Application filed May 18, 1925. Serial No. 30,931.

*To all whom it may concern:*

Be it known that I, BENNO F. JANCKE, a citizen of Germany, residing at New York city, in the county of New York and State of New York, have invented certain new and useful Improvements in Switch Controls for Electric Hair Driers, of which the following is a specification.

My invention relates to a new and improved switch control for electric hair driers.

One of the objects of my invention is to provide a switch control whereby the motor which actuates the blower or other means for producing an air current can be conveniently controlled through a greater range of speeds than has been hitherto thought possible.

Another object of my invention is to provide a combined switch control for the said motor and for the current utilized for heating the electric heating coils, which shall produce a greater range and flexibility of heat control than has hitherto been thought possible.

Another object of my invention is to provide a combined switch control which will embody separate and special means for controlling the heating current supplied to the electric heating coils, independent of the control for the speed of the motor.

Other objects of my invention will be set forth in the following description and drawings which illustrate a preferred embodiment thereof.

Fig. 4 is an elevation partially in section illustrating one of the switches used for the said combined control.

Fig. 5 is a top plan view of Fig. 4 with certain of the parts removed so as to show the details more clearly.

Fig. 6 is an elevation of the double coil switch.

Fig. 7 is an elevation of a single coil switch.

Fig. 8 is a top view of Fig. 6.

Fig. 9 is a top view of Fig. 7.

Figure 1:
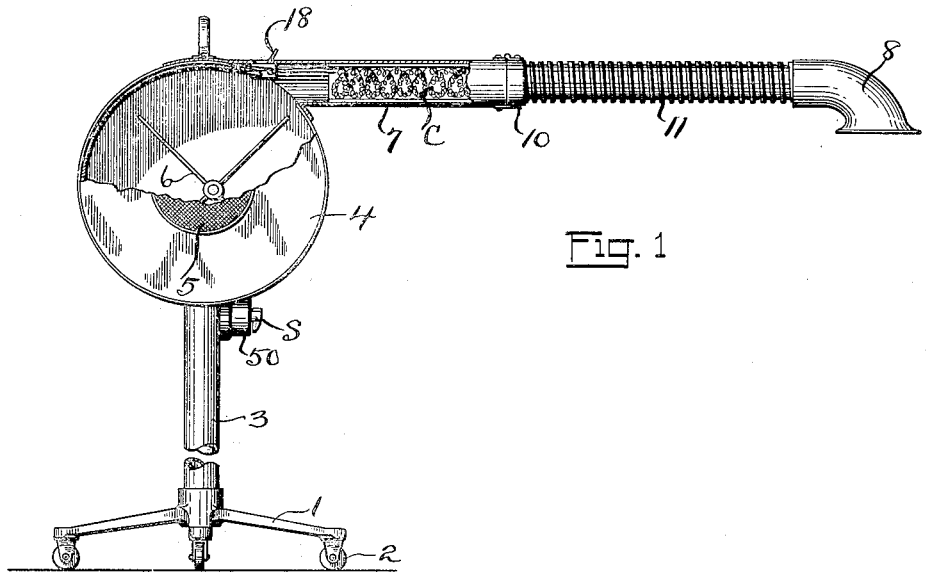
Fig. 1 is an elevation partially in section of a hair drier embodying my invention.
Figure 2:
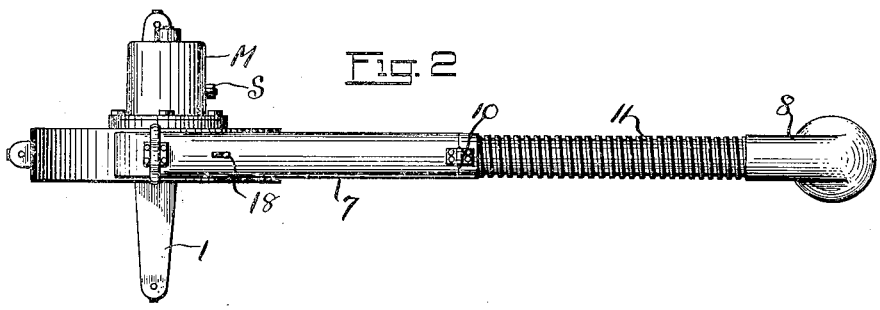
Fig. 2 is a top view thereof.
Figure 3:
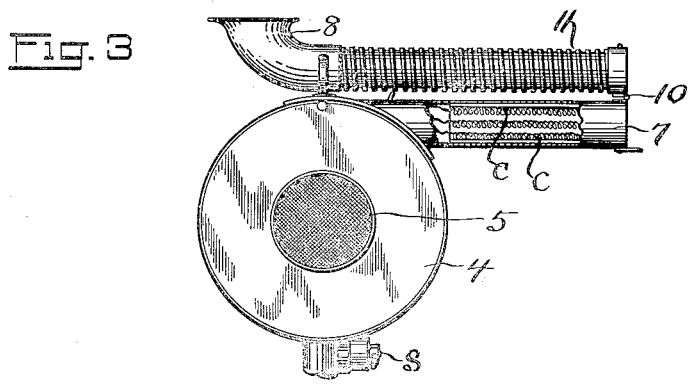
Fig. 3 is a detail view.

Fig. 10 diagrammatically illustrates the control when a single heating coil is used.

Fig. 11 diagrammatically illustrates the control when a double heating coil is used.

Fig. 12 diagrammatically illustrates the motor switch when it is in the "off" position, that is, when the motor is not running.

Fig. 13 diagrammatically illustrates the motor switch when the motor is being operated at the first or lowest speed.

Fig. 14 diagrammatically illustrates the motor switch when the motor is being operated at the second or intermediate speed.

Fig. 15 diagrammatically illustrates the motor switch when the motor is being operated at the third or highest speed.

The hair drier consists of certain well known parts such as a stand 1 mounted on rollers or wheels 2, a pedestal 3 and a casing 4 having a central open portion 5 which is provided with the usual wire screen. A revoluble fan 6 of the ordinary type is actuated by an ordinary electric motor which is preferably of the series type. The air current produced by the revolution of the fan 6 enters through the open portion 5 of the casing 4 and is then forced through the outlet pipe 7 having the heating coil or coils C. The outlet pipe 7 has the ordinary nozzle 11 connected thereto by means of the hinge 10. The nozzle 11 is provided with the ordinary flaring mouth 8. The motor M is controlled by a motor switch which can be moved into, and is operative in, four positions so that the motor may be stopped, or it may be driven at a first or lowest speed, at a second or intermediate speed, and at a third or highest speed.

As diagrammatically shown in Figs. 10–15 inclusive, one terminal or brush of the motor M is connected at 17 to one of the mains leading to the source of electric current. The lead 17' is connected to the switch terminal B. The switch is provided with other terminals C, D, E and A.

In order to control the current sent through the motor, a switch of the Hart Hegeman type, patented February 25, 1913, is employed together with certain modifications intended to adapt it for the purposes before described. This switch has a central revoluble switch member 55 made of any suitable metal and having an upper part and a lower part. The upper part has three blades $U^1$, $U^2$ and $U^3$ and the lower part has four blades $L^1$, $L^2$, $L^3$ and $L^4$. The upper and lower switch members are each suitably insulated from the metal member 55 by sheets of insulation 51 and 57 and they are suitably connected by any suitable conductor. The switch member 55 is provided with an upper head 49' which is engaged by the switch button S made of any suitable insulating material and which is held in position by a screw 49. If it is assumed that the switch is held in the position shown in Fig. 4 with the base 12 thereof horizontal, then the three upper planar switch blades $U^1$, $U^2$ and $U^3$ are all at the same level. The three lower blades $L^1$, $L^2$ and $L^3$ are also planar in shape and are mounted at the same lower level but the lower blade $L^1$ is L-shaped so that the horizontal top thereof is intermediate the upper blades and the other three lower blades.

As shown in Fig. 5, the base 12 of the switch, which is made of any suitable insulating material, is provided with five terminals or pairs of contact blades which are generally designated as A, B, C, D and E. Each pair of said blades is provided with an upstanding projection 54 having a binding screw for holding the end of a wire in position. The insulating base 12 is suitably perforated so that the wires can be led through it in proper position. The contact D, which may be called the second or central contact, has a sheet of insulation I mounted in front thereof.

In the position shown in Figs. 4 and 5, the switch is assumed to be in the "off" position, that is, in the position in which no current is fed to the motor M. In this position the lower blade $L^1$ is above the jaws of the contact B, the lower blade $L^2$ is below the jaws of the contact C, the lower blade $L^3$ is below the jaws of the contact E and the lower contact blade $L^4$ is below the jaws of the contact A. The upper blades $U^1$, $U^2$ and $U^3$ do not contact with any of the jaws of the said contacts. Upon turning the switch member 55 ninety degrees by means of the head or button S, the motor is caused to revolve at the first speed thereof. In this position the lower blade $L^4$ is forced between the jaws of the contact B, the lower blade $L^1$ is forced between the jaws of the contact C, the lower blade $L^2$ is below the jaws of the contact E and the lower blade $L^3$ is below the jaws of the contact A. In this position the upper blade $U^2$ is forced between the jaws of the contact D, which are higher than the jaws of the other contacts.

Upon turning the revoluble switch member ninety degrees, the motor has sufficient current fed thereto to be actuated at the second or intermediate speed. In this position the lower blade $L^3$ is forced between the jaws of the contact B, the lower blade $L^4$ is below the jaws of the contact C, the lower blade $L^1$ enters the jaws of the contact E, and the lower blade $L^2$ is below the jaws of the contact A. In this position the upper blade $U^1$ is forced between the jaws of the contact D.

The jaws of the contacts C, E, A are all of the same height and the jaws of the contact B is below the jaws of the other three contacts. As previously stated, the lower blade L' is above the three companion blades $L^2$, $L^3$ and $L^4$.

The rear positions of the various contacts and switch blades are shown diagrammatically in Figs. 10–15 inclusive. The reference letter "L" adjacent the contact B indicates that this is the lowest of the five contacts and the reference letter "H" denotes that the contact D is the highest of the five contacts. It is clear from Figs. 10 and 11 that the contacts A, C and E are connected to the brush or terminal of the motor M through intermediate resistance coils R. Hence, in the position of the switch parts designated in Fig. 13, which represents the first speed, the terminal 16 is connected to the switch terminal H through the coil or coils C, and the terminal D is connected to the terminals B and C through the switch arms $U^2$, $L^1$ and $L^4$. Hence, the amount of current fed to the motor M is determined by the resistance of the coil R connected to the terminal C. It is obvious that in the other two positions of the switch that the terminal D is always connected to the terminal B so that the motor is connected in shunt to the line and the speed of revolution of the motor is determined by the resistance of the coil which is then in the shunt circuit.

The coil or coils C can be thrown into and out of the circuit by the use of a switch or switches 18. However, even if the switch 18 in the embodiment shown in Fig. 10 is opened, this does not throw the motor out of the circuit, so that the motor M can keep on revolving. For example in Fig. 10 it is assumed that the switch 18 has been opened and the motor is allowed to revolve at the first speed to deliver a current of cold air. In this case the current entering at 16 passes through the motor, through a resistance coil R to the terminal C and then through the blades $L^1$ and $L^4$ to the terminal B and then through the line. It is obvious from Figs. 14 and 15 that the terminal B is always connected by the lower blades to one of the other terminals A, C and E so that the motor can be caused to revolve at all speeds, even when the heating coil or coils are out of the line, in which case the entire line current passes through the motor and none is utilized to heat the coil C.

The switch or switches 18 are conveniently mounted at the base of the pipe 7 and they may be of any conventional type, which is illustrated in somewhat more detail in Figs. 6-9 inclusive. An insulating member 42 has the metal blades 41 mounted on opposite sides thereof. A metal member 43 is connected to the insulating member 42. The switch lever 18 is pivotally mounted in the metal member 43 and it has an extension which is adapted to bear against the pin 46 which is slidably mounted in a slot of the member 47, which is made of insulating material and has the metal roller 44 connected to the bottom thereof. A compression spring 45 urges the pin 46 to the upper end of its slot so that by revolving the switch lever 18 the metal roller 44 can be forced into and out of contact with the blades 41 in the well known manner. In the embodiment shown in Fig. 8, the construction is the same as that in Figs. 6 and 7, save that a duplicate structure is provided. The switch shown in Fig. 4 is provided with a metal casing 50 of the ordinary type.

The resistance of the heating coil or coils is so low in comparison with the resistance of the regulated resistances R, that the speed of the motor is not substantially affected if a coil or coils C are thrown out of the circuit so that the motor is no longer connected in shunt across the line.

As shown in Figs. 10 and 11, the switch terminals C, E and A are connected to the terminal of the motor M by means of wires 31, 32 and 33 and the coil or coils C are connected to the switch terminal D by the wire 30.

For convenience, the terminal B may be called the first switch terminal, and the terminal D may be called the second switch terminal.

I have shown a preferred embodiment of my invention, but it is clear that numerous changes and omissions could be made without departing from its spirit.

I claim:—

1. In an electric hair drier the combination of a motor adapted to drive a fan for producing an air current, electric heating means adapted to heat the said air current, one terminal of said motor and one end of said electric heating means being adapted to be directly connected to one lead of an electric power line, and a switch embodying five switch terminals, said terminals including a first switch terminal which is adapted to be connected to the other electric power line lead, and a second switch terminal which is adapted to be connected to the other end of said electric heating means, additional switch means adapted to make and break the connection between the last mentioned switch terminal and the said electric heating means, each of the remaining three switch terminals being connected to the other motor terminal by resistance coils having different resistances, the said switch embodying a revoluble member having a plurality of blades and adapted to be moved into four different positions, the said blades being adapted in each of said four positions to always connect the said first switch terminal to the said second switch terminal and to also connect one of the remaining three switch terminals to the said first switch terminal and the said second switch terminal.

2. In an electric hair drier the combination of a motor adapted to drive a fan for producing an air current, electric heating means adapted to heat the said air current, one terminal of said motor and one end of said electric heating means being adapted to be directly connected to one lead of an electric power line, and a switch embodying a plurality of switch terminals, said terminals including a first switch terminal which is adapted to be connected to the other electric power line lead and a second switch terminal which is adapted to be connected to the other end of said electric heating means, additional switch means adapted to make and break the connection between the last mentioned switch terminal and the said electric heating means, each of the remaining switch terminals being connected to the other motor terminal by resistance coils having different resistances, the said switch embodying a revoluble member having a plurality of blades and adapted to be moved into a plurality of different positions, the said blades being adapted in each of said positions to always connect the said first switch terminal to the said second switch terminal and to also connect one of the remaining switch terminals to the said first switch terminal and the said second switch terminal.

3. An electric hair drier according to claim 1 in which the first switch terminal is nearer the base of said switch than the other terminals, and the second switch terminal is further from the base than the other terminals, the remaining three switch terminals being all of the same distance from the base and being located in a plane between the first switch terminal and the second switch terminal, the blades of the said revoluble member comprising a first set of three blades adapted to make contact only with the second switch terminal, and a second set of four blades, three of which are adapted to contact only with the first switch terminal, the fourth blade of the second set being further away from the base of the switch than the other three blades of the second set, and being adapted to contact with all the said switch terminals except the first and the second.

In testimony whereof I affix my signature.

BENNO F. JANCKE.